(12) United States Patent
Halcom

(10) Patent No.: US 10,836,478 B2
(45) Date of Patent: Nov. 17, 2020

(54) SEPARATION OF COLLECTIVE AND CYCLIC ACTUATION

(71) Applicant: Sikorsky Aircraft Corporation, Stratford, CT (US)

(72) Inventor: Lance Halcom, Coppell, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 659 days.

(21) Appl. No.: 15/246,254

(22) Filed: Aug. 24, 2016

(65) Prior Publication Data
US 2017/0057629 A1 Mar. 2, 2017

Related U.S. Application Data

(60) Provisional application No. 62/209,205, filed on Aug. 24, 2015.

(51) Int. Cl.
*B64C 27/605* (2006.01)
*B64C 27/64* (2006.01)
*B64C 27/68* (2006.01)

(52) U.S. Cl.
CPC ............ *B64C 27/605* (2013.01); *B64C 27/64* (2013.01); *B64C 27/68* (2013.01)

(58) Field of Classification Search
CPC ....... B64C 27/605; B64C 27/64; B64C 27/68; B64C 2027/7238; B64C 2027/7255
See application file for complete search history.

(56) References Cited

U.S. PATENT DOCUMENTS

| | | | | |
|---|---|---|---|---|
| 2,829,721 A | * | 4/1958 | Gebhard | B64C 11/48 416/115 |
| 3,135,335 A | * | 6/1964 | Cruz | B64C 27/54 416/18 |
| 3,554,662 A | * | 1/1971 | Lemont | B64C 27/605 416/1 |
| 4,445,421 A | * | 5/1984 | Walker | B64C 27/605 416/114 |
| 4,669,958 A | * | 6/1987 | Peyran | B64C 27/605 416/114 |
| 5,048,273 A | * | 9/1991 | Orsborn | A01D 46/085 56/10.2 R |
| 6,530,542 B2 | * | 3/2003 | Toulmay | B64C 27/001 244/17.13 |

(Continued)

FOREIGN PATENT DOCUMENTS

GB 2308112 A * 6/1997 .......... B64C 27/605

*Primary Examiner* — Woody A Lee, Jr.
*Assistant Examiner* — Justin A Pruitt
(74) *Attorney, Agent, or Firm* — Foley & Lardner LLP

(57) ABSTRACT

A rotor actuation system includes a swashplate assembly comprised of a stationary swashplate and a rotating swashplate operatively connected together for relative rotation about a rotor axis. A cyclic actuator is operatively connected to the stationary swashplate to tilt the swashplate assembly off axis from the rotor axis for cyclic control. A collective actuator is operatively connected to the swashplate assembly to move the swashplate axially along the rotor axis for collective control. The cyclic actuator and the collective actuator are operatively connected to the swashplate assembly to respectively actuate cyclic and collective control independent of one another.

13 Claims, 6 Drawing Sheets

(56) References Cited

U.S. PATENT DOCUMENTS

| | | | |
|---|---|---|---|
| 7,118,340 B2 * | 10/2006 | D'Anna | B64C 27/10 |
| | | | 416/1 |
| 7,648,338 B1 * | 1/2010 | Welsh | B64C 27/001 |
| | | | 416/1 |
| 7,988,089 B2 * | 8/2011 | Wittmer | B64C 27/68 |
| | | | 244/17.13 |
| 2008/0185476 A1 * | 8/2008 | Suisse | F15B 18/00 |
| | | | 244/78.1 |
| 2009/0084891 A1 * | 4/2009 | Darrow, Jr. | B64C 7/00 |
| | | | 244/17.19 |
| 2009/0321555 A1 * | 12/2009 | Nitzsche | B64C 27/001 |
| | | | 244/17.13 |
| 2014/0091172 A1 | 4/2014 | Arlton et al. | |
| 2014/0205457 A1 * | 7/2014 | Curlier | B64C 11/306 |
| | | | 416/160 |

* cited by examiner

SEPARATION OF COLLECTIVE AND CYCLIC ACTUATION

CROSS-REFERENCE TO RELATED APPLICATION

This application claims the benefit of priority under 35 U.S.C. § 119(e) to U.S. Provisional Application No. 62/209,205, filed Aug. 24, 2015, which is incorporated herein by reference in its entirety.

BACKGROUND OF THE INVENTION

1. Field of the Invention

The present disclosure relates to rotor actuation, and more particularly to rotor actuation such as used in control of rotorcraft.

2. Description of Related Art

A variety of devices and methods are known in the art for cyclic and collective control in rotorcraft. In a typical configuration, a plurality of actuators connect between the airframe and a non-rotating swashplate. A rotating swashplate rotatably mounted to the non-rotating swashplate connects to the rotor blades through a set of links. In this way, non-rotating actuators can be used to impart cyclic and collective actuation onto the rotating rotor blades.

In a typical rotor control system three or more linear actuators, e.g., spaced apart circumferentially about the swashplate assembly from one another, each contribute to both cyclic and collective control. For example, when all of the actuators move together in the same direction, a collective change in pitch results at the rotor blades. When one or more of the actuators moves independently of the others, a cyclic change in pitch results at the rotor blades. Since cyclic and collective control is coupled due to this arrangement of actuators, a controller with a set of command laws can be used to interpret commands received, e.g., from a pilot, into what motion should be imparted by each actuator to carry out the commanded change.

Such conventional methods and systems have generally been considered satisfactory for their intended purpose. However, there is still a need in the art for improved rotor actuation. The present disclosure provides a solution for this need.

SUMMARY OF THE INVENTION

A rotor actuation system includes a swashplate assembly comprised of a stationary swashplate and a rotating swashplate operatively connected together for relative rotation about a rotor axis. A cyclic actuator is operatively connected to the stationary swashplate to tilt the swashplate assembly off axis from the rotor axis for cyclic control. A collective actuator is operatively connected to the swashplate assembly to move the swashplate axially along the rotor axis for collective control. The cyclic actuator and the collective actuator are operatively connected to the swashplate assembly to respectively actuate cyclic and collective control independent of one another.

A main rotor assembly (e.g., used for lifting the rotorcraft) can be operatively connected to the swashplate assembly for collective and cyclic control of the main rotor assembly. It is also contemplated that a propulsor or tail rotor assembly can be operatively connected to the swashplate for collective and cyclic control of the propulsor/tail rotor assembly.

The swashplate assembly can be mono-cyclic with a single cyclic actuator, wherein the swashplate assembly is pinned for rotation about a cyclic rotation axis substantially perpendicular to the rotor axis. It is also contemplated that the swashplate assembly can be multi-cyclic with a plurality of circumferentially spaced apart cyclic actuators operatively connected to the swashplate assembly for movement of the swashplate assembly about a plurality of axes off axis from the rotor axis.

The system can include a standpipe extending along the rotor axis and a slider translationally engaged to the standpipe. The swashplate assembly can be mounted to the slider, and the collective actuator can be operatively connected to the standpipe and the slider to actuate the standpipe and the slider axially relative to one another along the rotor axis for collective control. Each cyclic actuator can be mounted between the slider and the stationary swashplate to locally tilt the stationary swashplate and slider toward and away from a common axis.

The system can include a bearing element between the swashplate assembly and the rotor axis and/or slider, wherein the bearing element forms a pivot point for off axis rotation of the swashplate assembly relative to the rotor axis and/or slider. The collective actuator can be a hydraulic or electro-mechanical actuator in an annular space between the standpipe and the slider. It is also contemplated that the collective actuator can be mounted to the standpipe and slider externally.

Each cyclic actuator can include a plurality of actuator stages. It is also contemplated that the collective actuator can include a plurality of actuator stages. At least one of the cyclic and collective actuators, and/or the system as a whole, can include at least one of a spring or an actuator lock-out configured to return the swashplate assembly to a neutral position in the case of actuator failure. At least one of the cyclic and collective actuators can define an actuator axis of motion that is angled relative to the rotor axis.

A control system for rotor actuation can include a rotor actuation system as described above. A controller is operatively connected to the cyclic and collective actuators, wherein the controller is configured to receive command input and apply a set of control laws to issue commands to the cyclic and collective actuators for independent actuation of collective and cyclic motion on the swashplate assembly based on the command input.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
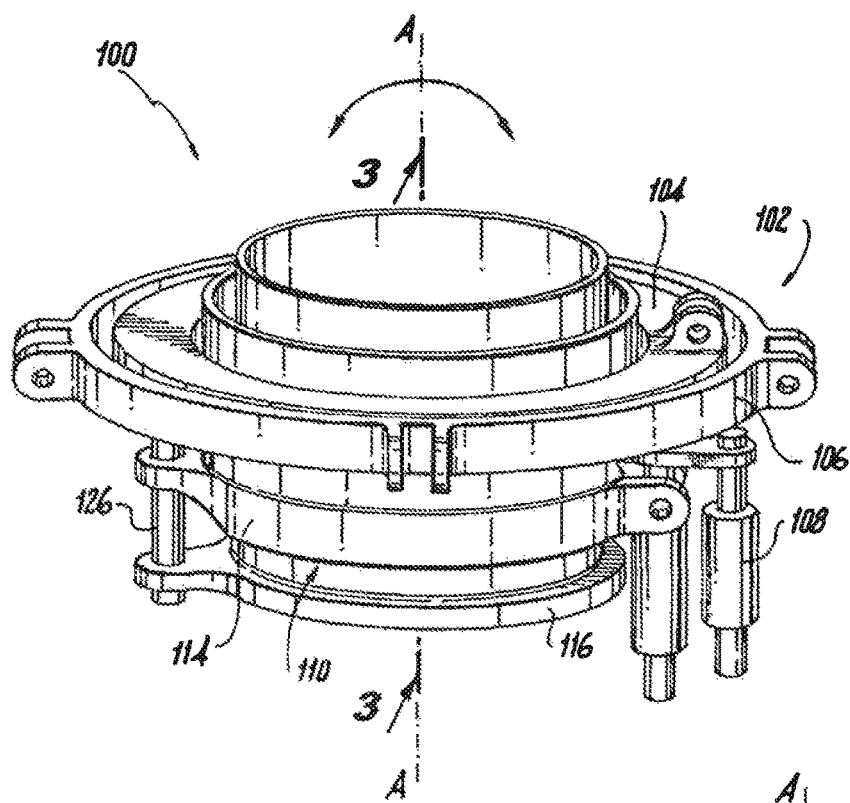
FIG. 1 is a perspective view of an exemplary embodiment of a rotor actuation system constructed in accordance with the present disclosure, showing a mono-cyclic actuator configuration.

Reference will now be made to the drawings wherein like reference numerals identify similar structural features or aspects of the subject disclosure. For purposes of explanation and illustration, and not limitation, a partial view of an exemplary embodiment of a rotor actuation system 100 in accordance with the disclosure is shown in FIG. 1 and is designated generally by reference character 100. Other embodiments of rotor actuation systems in accordance with the disclosure, or aspects thereof, are provided in FIGS. 2-10, as will be described. In this manner, the rotor actuation systems can combine a collective servo with a swashplate uniball and allow two other linear or rotary actuators (or even just one) to serve the cyclic command authority. By dedicating servos to the different functions in this manner, the servos' flight-criticality is inherently diminished. The systems and methods described herein can be used to decouple cyclic and collective actuation, for example in helicopter main rotors, in tilt rotors, and in propulsor rotors.

Rotor actuation system 100 includes a swashplate assembly 102 including a stationary swashplate 104 and a rotating swashplate 106 operatively connected together for relative rotation about a common axis substantially coaxial to a rotor axis A. A cyclic actuator 108 is operatively connected to stationary swashplate 104 to tilt the swashplate assembly off axis from the rotor axis A, e.g., in the direction indicated by double arrows in FIGS. 1 and 4, for cyclic control. For example, in a helicopter, cyclic control allows the pilot or a flight program to pitch and roll the aircraft. While shown as a dual stage cyclic actuator 108, it is understood that other numbers of stages can be used such as a triple stage actuator in other embodiments. A collective actuator 110 is operatively connected to swashplate assembly 102 to move the swashplate axially along rotor axis A for collective control. Mechanical links (not shown) connect the rotating swashplate 106 to individual rotor blades (not shown) so that motion imparted on swashplate assembly 102 by cyclic and collective actuators 108 and 110 is ultimately imparted on to control pitch of the rotor blades.

Cyclic actuator 108 and collective actuator 110 are operatively connected to swashplate assembly 102 to respectively actuate cyclic and collective control independent of one another. In this way, cyclic and collective control actuation are decoupled from one another.

Figure 2:
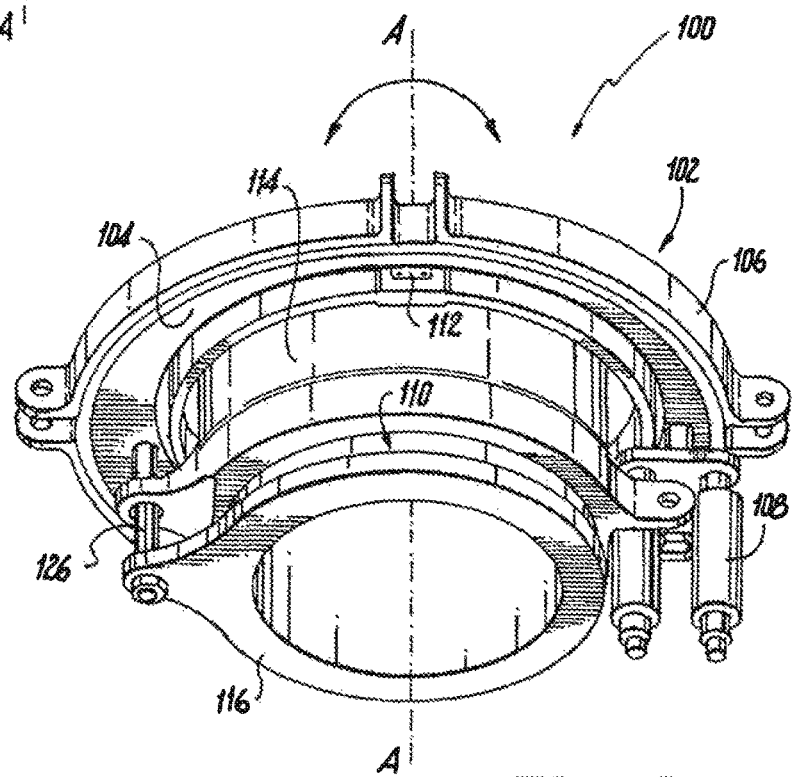
FIG. 2 is a perspective view of the system of FIG. 1, showing the lower portion of the swashplate assembly, as oriented in FIG. 1.

Referring now to FIG. 2, swashplate assembly 102 can be mono-cyclic with a single dual-stage cyclic actuator 108. Swashplate assembly 102 is pinned by two opposed pins 112 to slider 114 for tilting about a cyclic rotation axis substantially perpendicular to the rotor axis, i.e., for rotation in the direction indicated by double arrows in FIG. 2. This mono-cyclic configuration allows for cyclic control e.g., for command authority for rotation of an aircraft in one direction such as pitch or roll. In order to have both pitch and roll authority, a counter rotating set of rotor blades could be used, wherein each set of rotor blades is controlled by a separate mono-cyclic swashplate assembly, e.g., with one of the counter-rotating blade sets having cyclic control for roll, and the other having cyclic control for pitch.

System 100 includes a standpipe 116 extending along the rotor axis A and slider 114 is slidingly engaged to the outside of standpipe 116. The swashplate assembly 102 is in turn mounted to the slider, e.g., by pins 112 described above. Collective actuator 110 is operatively connected to standpipe 116 and slider 114 to actuate standpipe 116 and slider 114 axially relative to one another along the rotor axis A for collective control. Collective actuator 110 can therefore actuate swashplate assembly 102 along rotor axis A regardless of and independent of the positioning of cyclic actuator 108 and the corresponding angle of swashplate assembly 102 relative to rotor axis A. Each cyclic actuator 108, which in the shown embodiment is only one, is mounted between slider 114 and stationary swashplate 104 to locally tilt stationary swashplate 104 with respect to slider 114. In this way, cyclic actuator 108 can actuate the angle of swashplate assembly 102 relative to rotor axis A independent of and regardless of the positioning of collective actuator 110.

Figure 3:
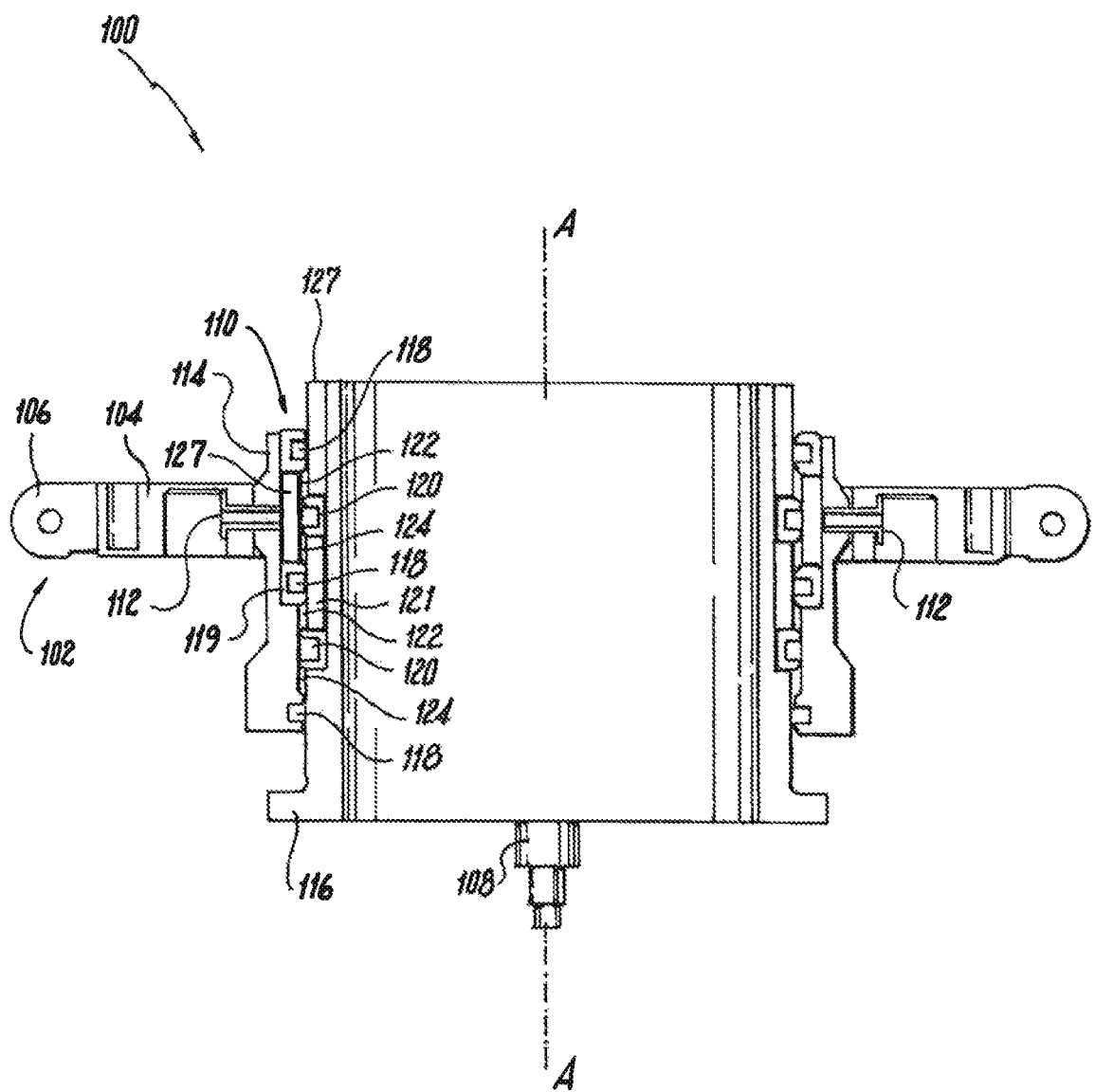
FIG. 3 is a cross-sectional elevation view of the system of FIG. 1, showing the cross-section indicated in FIG. 1.

With reference now to FIG. 3, collective actuator 110 includes a dual-stage hydraulic actuator in an annular space between standpipe 116 and slider 114. Three seal rings 118 are mounted to slider 114, and two seal rings 120 are mounted to stand pipe 116. Two of the seal rings 118, and both of the seal rings 120 are seated in seal ring housings 119 that can be threaded, pinned, pressed-in, or the like, to place. Seal ring races 121 and 127 serve as spacers between the seal ring housings 119. The dual-stage hydraulic actuator is provided by the four compartments 122 and 124, wherein if compartments 122 are pressurized, swashplate assembly 102 will move upward along rotor axis A relative to stand pipe 116, as oriented in FIG. 3. If compartments 124 are pressurized, then swashplate assembly 102 will move downward along rotor axis A relative to stand pipe 116, as oriented in FIG. 3. Those skilled in the art will readily appreciate that porting/fittings, can be configured on slider 114 and/or stand pipe 116 for access of hydraulic system 130 to compartments 122 and 124. Potential advantages of actuator 110 include, among others, a small envelope, and due do its depth within the structure, it is quite safe from foreign object and ballistic damage.

Figure 4:
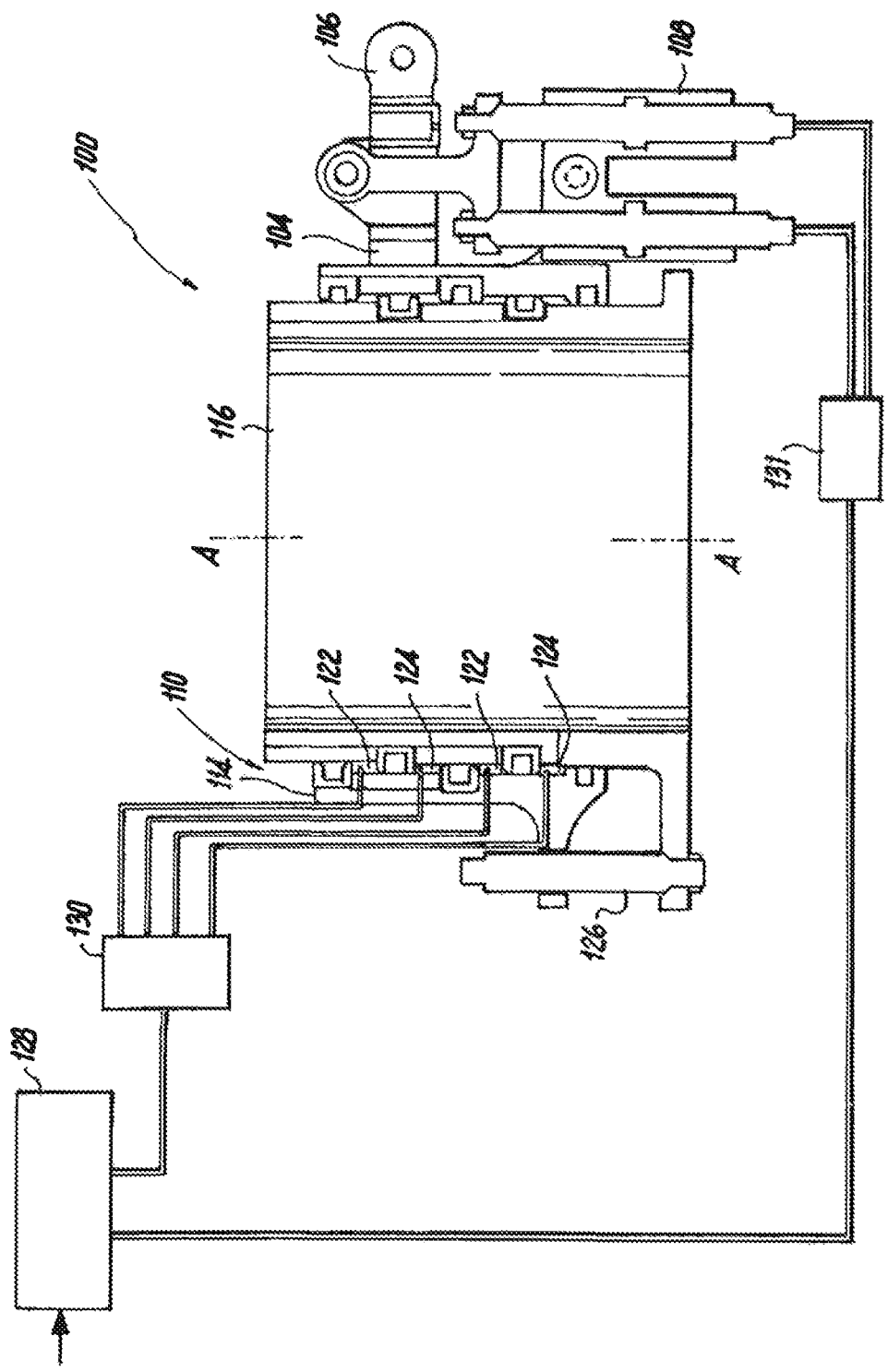
FIG. 4 is a cross-sectional elevation view of the system of FIG. 1, showing the dual-stage cyclic actuator.

As shown in FIG. 4, a collective position sensor 126 is mounted axially between flanges of stand pipe 116 and slider 114 for monitoring the amount of collective actuation, and serves as a derotation mechanism between slider 114 and stand pipe 116. The control system for rotor actuation system 100 includes a controller 128. Controller 128, shown schematically in FIG. 4, is operatively connected to sensor 126 as well as to hydraulic system 130, which is in turn connected to compartments 122 and 124 for control of actuator 110, and to hydraulic system 131, which is in turn connected for control of cyclic actuator 108. Hydraulic systems 130 and 131 can be part of the same overall hydraulic system, or can be separate systems. Controller 128 is also operatively connected to cyclic actuator 108. Controller 128 is configured to receive command input, as indicated by the arrow pointing into controller 128 in FIG. 4, and apply a set of control laws to issue commands to the cyclic and collective actuators 108 and 110 for independent actuation of collective and cyclic motion on swashplate assembly 102 based on the command input. The command input can be indicative of input from a pilot, ground operator, and/or autonomous flight control, for example.

Figure 5:
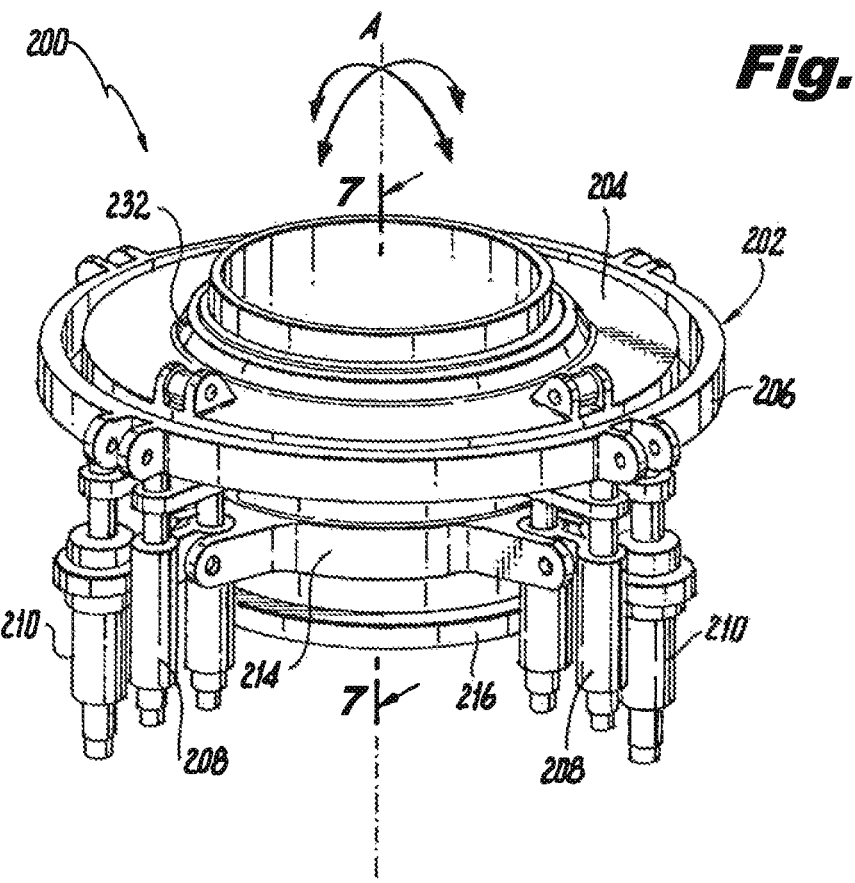
FIG. 5 is a perspective view of another exemplary embodiment of a rotor actuation system constructed in accordance with the present disclosure, showing a multi-cyclic actuation configuration.
Figure 6:
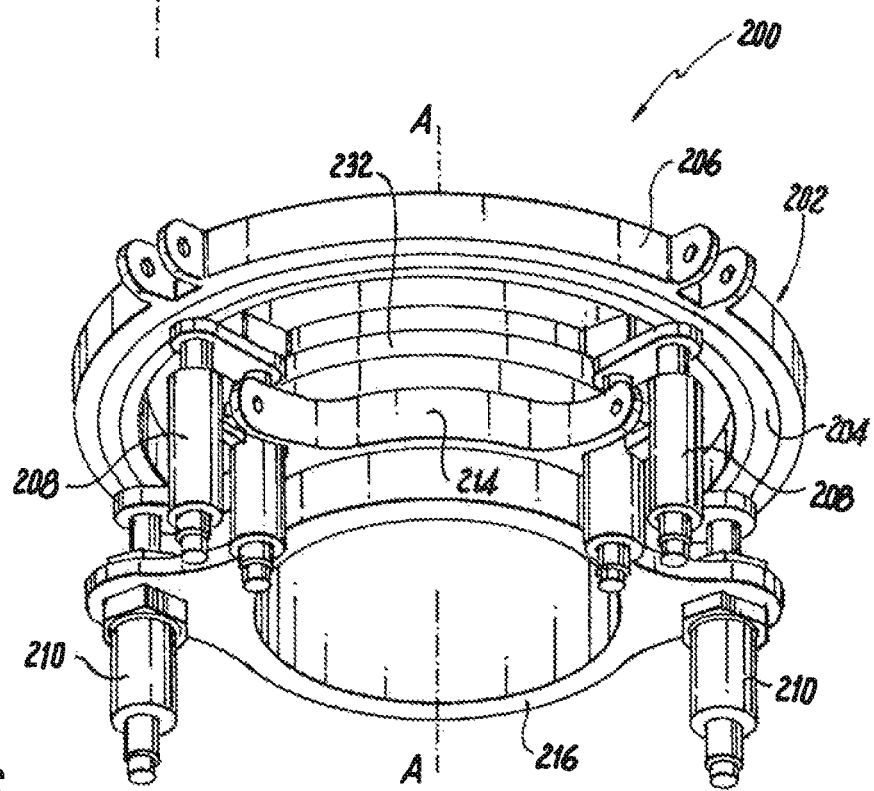
FIG. 6 is a perspective view of the system of FIG. 5, showing the lower portion of the swashplate assembly, as oriented in FIG. 5.

With reference now to FIG. 5, another exemplary embodiment of a rotor actuation system 200 is described, which includes swashplate assembly 202, stationary swashplate 204, rotating swashplate 206, slider 214, and stand pipe 216, much as described above. Swashplate assembly 202 is multi-cyclic with a plurality of circumferentially spaced apart cyclic actuators 208 operatively connected to swashplate assembly 202 for movement of swashplate assembly 202 about a plurality of axes off axis from the rotor axis A, as indicated by the double arrows in FIG. 5. In this example, two dual-stage actuators 208 are circumferentially spaced apart 90° (azimuthal separation) from one another. The aircraft control phase angle is adjustable by changing the azimuthal location of the cyclic actuator pairing, e.g., through the stand pipe 216 (and slider 214) mounting to the airframe.

Figure 7:
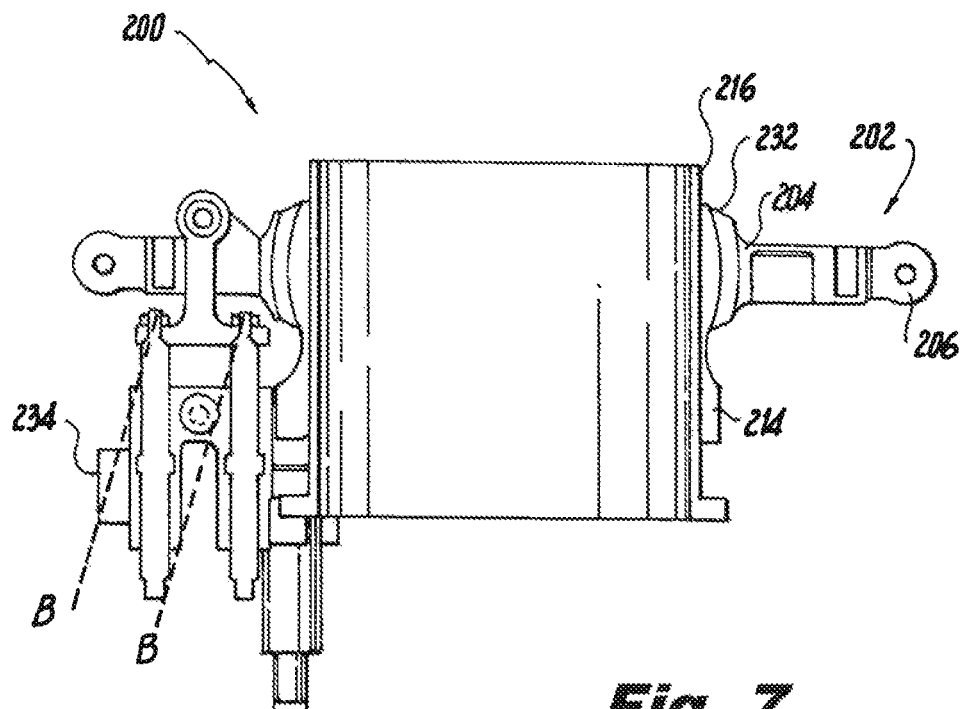
FIG. 7 is a cross-sectional elevation view of the system of FIG. 5, showing the cross-section indicated in FIG. 5.

A bearing element 232 is included between swashplate assembly 202 and the rotor axis A, e.g., bearing element 232 is between stationary swashplate 204 and slider 214. As shown in FIG. 7, stationary swashplate 204 and bearing element 232 form a ball and socket type joint. Bearing element 232 can be elastomeric, or of any other suitable material for thrust and misalignment capability, forming a pivot point for each of the cyclic actuators 208 in much the same way as pins 112 described above, but in multiple axes for off axis rotation of swashplate assembly 202 relative to the rotor axis A as illustrated schematically in FIG. 5. Bearing element 232 can be a non-integral component, but advantageously should allow for cocking/misalignment.

Figure 8:
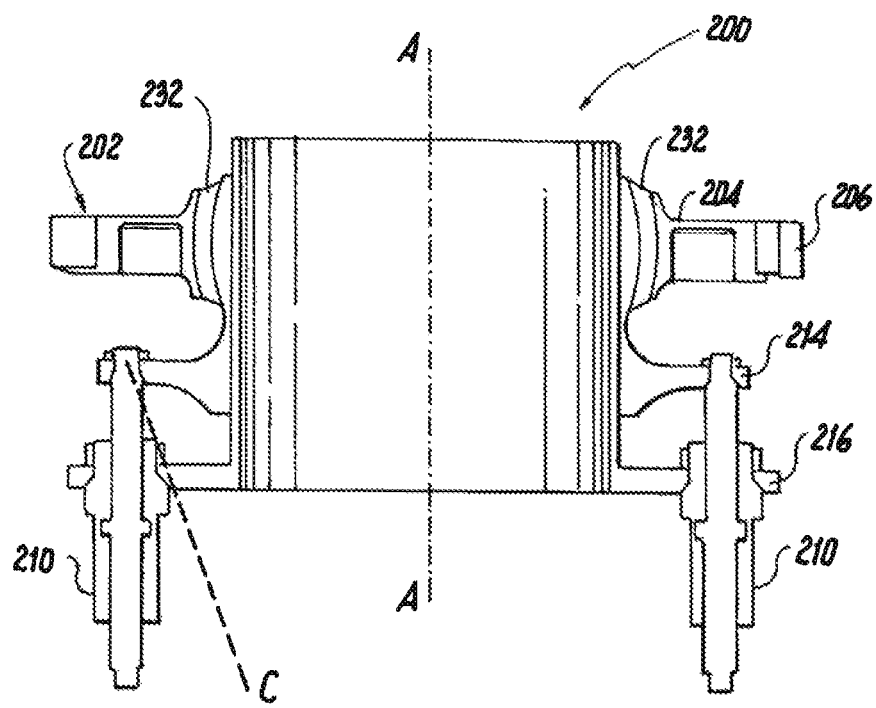
FIG. 8 is a cross-sectional elevation view of the system of FIG. 1, showing the dual-stage collective actuator.

Collective actuator 210 is a dual-stage actuator, each stage of which is mounted to the standpipe 216 and slider 214 externally, and each stage of which is on an opposite side, e.g., 180° apart from one another, as shown in the cross-section of FIG. 8. A similar controller can be connected to control collective and cyclic actuators 210 and 208, as can optional sensors, like sensor 126 described above, for sensing positions of any of the actuators 210 and 208. Collective actuator 210 can also serve as a derotation mechanism between slider 214 and stand pipe 216.

While shown and described above in the exemplar context of hydraulic actuators, those skilled in the art will readily appreciate that any other suitable type of actuator can be used without departing from the scope of this disclosure. For example, electro-mechanical actuators ball screws or worm gears, can be used in addition to or in lieu of hydraulics for any of the collective or cyclic actuators described herein.

The cyclic and collective actuators described herein are dual-stage actuators for redundancy, however, those skilled in the art will readily appreciate that single stage configurations, or any other suitable number of stages can be used without departing from the scope of this disclosure. Rotary actuators can optionally be used in lieu of or in addition to linear actuators. For example, actuator 208 could be replaced by a rotary actuator in the position of one of the pins 112 or attaching where it does to slider 214 with a link extending up to, and connecting to stationary swashplate 204. At least one of the cyclic and collective actuators can include at least one of a return device 234 shown schematically in FIG. 7, such as a spring or an actuator lock-out, configured to return the swashplate assembly to a neutral position in the case of actuator failure. Bearing 232 can also be configured to serve this function, as can torsional springs about pivot pins 112.

While all of the actuators described above are mounted parallel to the respective rotor axis, those skilled in the art will readily appreciate that at least one of the cyclic and collective actuators can define an actuator axis of motion that is angled relative to the rotor axis. This option is indicated schematically in FIG. 7, where angled actuator axes B and C are indicated for actuators 208 and 210, respectively, with dashed lines. This can be used, for example, if needed to accommodate a constrained packaging envelope. Since the collective and cyclic actuation is decoupled, the control laws, e.g., in controller 128, can easily be adapted to accommodate such angled actuator axes, compared to what would be needed in traditional actuation schemes with angled actuators each serving both collective and cyclic control.

Figure 9:
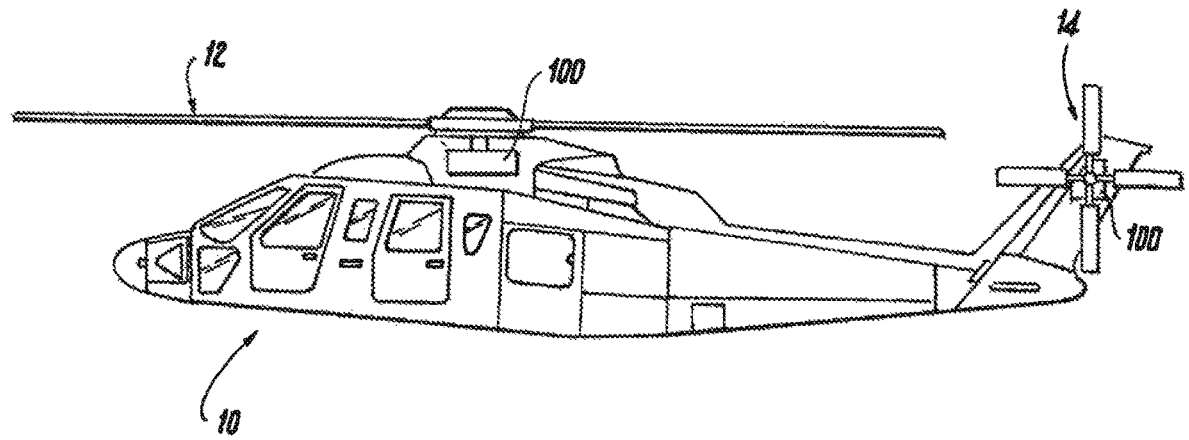
FIG. 9 is a schematic view of an aircraft incorporating the system of FIG. 1 in its main and/or tail rotor assemblies.
Figure 10:
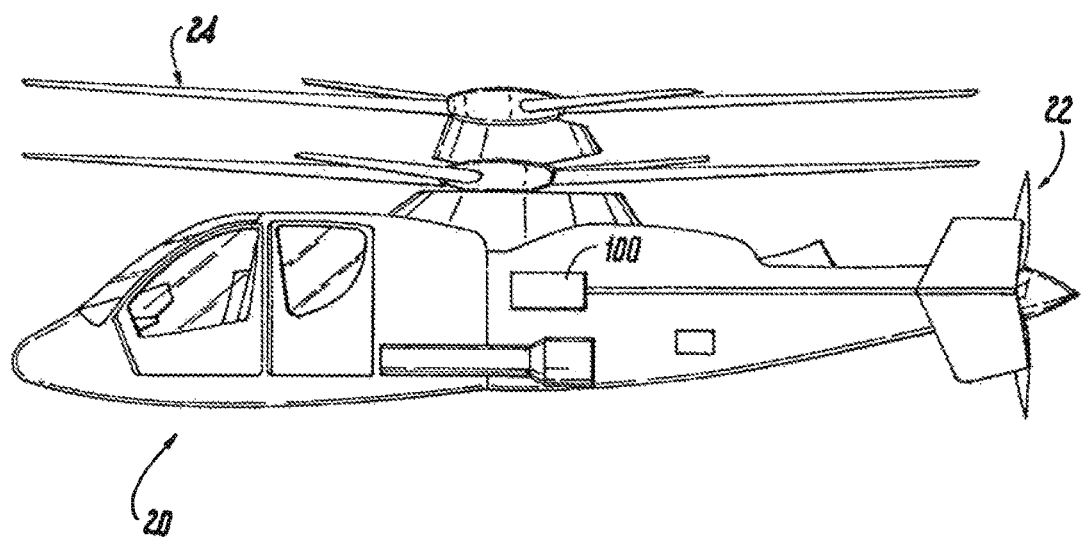
FIG. 10 is a schematic view of an aircraft incorporating the system of FIG. 1 in its main and/or propulsor rotor assemblies.

With reference now to FIG. 9, it is contemplated that system 100, or optionally system 200, can operatively connect a main rotor 12, e.g., a lift rotor assembly, or a tail rotor 14 to the swashplate assembly 102 for collective and cyclic control of either rotor, as in the case of helicopter 10 indicated schematically in FIG. 9. As indicated schematically in FIG. 10, it is also contemplated that a propulsor rotor assembly 22 can be operatively connected to the swashplate assembly 102 of system 100, or optionally 200, for collective and cyclic control of the propulsor rotor assembly 22, as in the case of helicopter 20, which has counter rotating main rotors 24. Optionally, all or either of the rotors 22 and 24 can have a respective system 100, 200. It is also contemplated that systems 100 and 200 can be used in any other suitable rotor application, such as tilt rotor aircraft, fixed wing aircraft, or the like.

Various advantages using the systems and method described herein can be attained over traditional systems. For example, due to the decoupling of cyclic and collective actuation, the flight criticality of any given actuator can be considerably reduced. The systems and methods described herein can therefore provide for safer, more robust aircraft than in traditional systems. The control laws can be simplified, and can more easily be adapted to unusual actuator locations, angles, and the like. Not only can the development of the control laws can be simplified, but their testing and tuning can be greatly reduced compared to traditional systems. It is also contemplated that the control phase angle of the aircraft can be more easily adjusted.

The methods and systems of the present disclosure, as described above and shown in the drawings, provide for rotor actuation with superior properties including decoupled collective and cyclic actuation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor actuation system comprising:
a counter rotating co-axial main rotor assembly including a lower rotor assembly and an upper rotor assembly;
a first swashplate assembly including a first stationary swashplate and a first rotatable swashplate operatively connected to the lower rotor assembly, the first stationary swashplate being operatively connected to the first rotatable swashplate, wherein the first rotatable swashplate is rotatable relative to the first stationary swashplate about a rotor axis;

a second swashplate assembly including a second stationary swashplate and a second rotatable swashplate operatively connected to the upper rotor assembly, the second stationary swashplate being operatively connected to the second rotatable swashplate, wherein the second rotatable swashplate is rotatable relative to the second stationary swashplate about the rotor axis;

two dual-stage mono-cyclic actuators, each of the two dual-stage mono-cyclic actuators operatively connected to a respective one of the first stationary swashplate and the second stationary swashplate to rotate the respective one of the first and second swashplate assemblies off axis from the rotor axis for cyclic control of one of the lower and upper rotor assemblies for roll and the other of the lower and upper rotor assemblies for pitch; and a dual-stage hydraulic collective actuator including a plurality of compartments operatively connected to the swashplate assembly independent of the dual-stage mono-cyclic actuators, the dual-stage hydraulic collective actuator being operable to move the stationary swashplate axially along the rotor axis for collective control by selectively pressurizing select ones of the plurality of compartments, wherein the dual-stage mono-cyclic actuator and the dual-stage hydraulic collective actuator are operatively connected to the swashplate assembly to respectively actuate cyclic and collective control independent of one another.

2. The rotor actuation system as recited in claim 1, further comprising a main rotor assembly operatively connected to the swashplate assembly for collective and cyclic control of the main rotor assembly.

3. The rotor actuation system as recited in claim 1, further comprising:
a propulsor rotor assembly operatively connected to the rotating swashplate for collective and cyclic control of the propulsor rotor assembly; or
a tail rotor assembly operatively connected to the rotating swashplate for collective and cyclic control of the tail rotor assembly.

4. The rotor actuation system as recited in claim 1, wherein the stationary swashplate is pinned to a slider for rotation about a cyclic rotation axis substantially perpendicular to the rotor axis.

5. The rotor actuation system as recited in claim 1, further comprising:
a standpipe extending along the rotor axis; and
a slider translationally engaged to the standpipe, wherein the swashplate assembly is mounted to the slider, and wherein the dual-stage hydraulic collective actuator is operatively connected to the standpipe and the slider to actuate the standpipe and the slider axially relative to one another along the rotor axis for collective control.

6. The rotor actuation system as recited in claim 5, wherein the dual-stage mono-cyclic actuator is mounted between the slider and the stationary swashplate to locally tilt the stationary swashplate and slider toward and away from a common axis.

7. The rotor actuation system as recited in claim 1, further comprising a bearing element between the swashplate assembly and the rotor axis or slider, wherein the bearing element forms a pivot point for off axis rotation of the swashplate assembly relative to the rotor axis/slider.

8. The rotor actuation system as recited in claim 1, wherein the dual-stage hydraulic collective actuator is a hydraulic actuator in an annular space between the standpipe and the slider.

9. The rotor actuation system as recited in claim 1, wherein the dual-stage hydraulic collective actuator is mounted to the standpipe and slider externally.

10. The rotor actuation system as recited in claim 1, wherein the dual-stage mono-cyclic actuator includes a plurality of actuator stages.

11. The rotor actuation system as recited in claim 1, wherein the dual-stage hydraulic collective actuator includes a plurality of actuator stages.

12. The rotor actuation system as recited in claim 1, wherein at least one of the dual-stage mono-cyclic and the dual-stage hydraulic collective actuator defines an actuator axis of motion that is angled relative to the rotor axis.

13. A control system for rotor actuation comprising:
a rotor actuation system as recited in claim 1; and
a controller operatively connected to the cyclic and collective actuators, wherein the controller is configured to receive command input and issue commands to the dual-stage cyclic and the dual-stage hydraulic collective actuator for independent actuation of collective and cyclic motion on the swashplate assembly based on the command input.

* * * * *